United States Patent
Nakanoya

(10) Patent No.: US 10,620,968 B2
(45) Date of Patent: Apr. 14, 2020

(54) PARAMETER DETERMINATION DEVICE, PARAMETER DETERMINATION METHOD, AND MEDIUM

(71) Applicant: NEC Corporation, Minato-ku, Tokyo (JP)

(72) Inventor: Manabu Nakanoya, Tokyo (JP)

(73) Assignee: NEC CORPORATION, Tokyo (JP)

(*) Notice: Subject to any disclaimer, the term of this patent is extended or adjusted under 35 U.S.C. 154(b) by 284 days.

(21) Appl. No.: 15/572,232

(22) PCT Filed: May 19, 2016

(86) PCT No.: PCT/JP2016/002440
§ 371 (c)(1),
(2) Date: Nov. 7, 2017

(87) PCT Pub. No.: WO2016/189834
PCT Pub. Date: Dec. 1, 2016

(65) Prior Publication Data
US 2018/0129516 A1 May 10, 2018

(30) Foreign Application Priority Data
May 25, 2015 (JP) .................................. 2015-105111

(51) Int. Cl.
*G06F 9/44* (2018.01)
*G06F 9/445* (2018.01)

(52) U.S. Cl.
CPC .......... *G06F 9/44505* (2013.01); *G06F 9/445* (2013.01)

(58) Field of Classification Search
CPC ..... G06F 1/32; G06F 1/26; G06F 1/28; G06F 9/44
See application file for complete search history.

(56) References Cited

U.S. PATENT DOCUMENTS 5,842,218 A * 11/1998 Robinson ............... G06F 16/26
9,647,897 B2 * 5/2017 Halmstad ............... H04L 41/22
(Continued)

FOREIGN PATENT DOCUMENTS

| JP | H05-81001 A | 4/1993 |
| JP | 2006-285666 A | 10/2006 |

(Continued)

OTHER PUBLICATIONS

International Search Report for PCT Application No. PCT/JP2016/002440, dated Jul. 19, 2016.
(Continued)

*Primary Examiner* — Jaweed A Abbaszadeh
*Assistant Examiner* — Keshab R Pandey

(57) ABSTRACT

A parameter determination device according to the present invention includes: a processing unit (PU); and a storage, wherein the storage stores: a program; a system configuration definition including a plurality of elements each of which is a parameter set to a setting category that defines a configuration of a system; and a rule including identifiers of first and second ones of the setting categories; and the PU reads the program and performs functions, the function including: a grouping unit that groups the elements, based on the parameter for the second setting category of the elements; and an assignment execution unit that sets and outputs a parameter that is identical within a group or that is unique within the group, for the first setting category of each of the elements in the group.

5 Claims, 13 Drawing Sheets

(56) References Cited

U.S. PATENT DOCUMENTS

| | | | |
|---|---|---|---|
| 2006/0143286 A1* | 6/2006 | Aoki | H04N 1/00209 709/220 |
| 2006/0204107 A1* | 9/2006 | Dugan | G06K 9/00664 382/217 |
| 2014/0007118 A1* | 1/2014 | Katagai | G06F 9/54 718/102 |
| 2014/0372579 A1 | 12/2014 | Kikuchi et al. | |

FOREIGN PATENT DOCUMENTS

| | | |
|---|---|---|
| JP | 2015-001826 A | 1/2015 |
| JP | 2015-095035 A | 5/2015 |

OTHER PUBLICATIONS

English translation of Written opinion for PCT Application No. PCT/JP2016/002440.

\* cited by examiner

Fig.4

```
Server: A
  NIC:  eth0
    application: X
    application: Y
  NIC:  eth1
    application: X
    application: Y
  NIC: eth2
    application: Z
Server: B
  NIC: eth0
    application: X
  NIC: eth1
    application: X
  NIC: eth2
    application: Y
Server : C
  NIC: eth0
    application: X
  NIC: eth1
    application: X
```

Fig.5

| ASSIGNMENT TARGET CATEGORY ID | GROUP-BY CATEGORY ID | CANDIDATE PARAMETER SET/ASSIGNMENT METHOD | SCOPE |
|---|---|---|---|
| act/sby | application Server | "act","sby" CYCLIC | local |
| SUBNET IP ADDRESS | application act/sby | ClassC ASCENDING ORDER | global |
| HOST IP ADDRESS | SUBNET IP ADDRESS | 1->254 DESCENDING ORDER | local |
| VLAN_ID | NIC | 100->200 ASCENDING ORDER | global |

Fig.11

```
Server: A                              Server: B
 NIC: eth0                              NIC: eth0
  application: X                         application: X
   act/sby: act                           act/sby: act
   vlan_id: 100                           vlan_id: 100
   subnet: 192.168.1.0/24                 subnet: 192.168.1.0/24
   hostip: 192.168.1.254                  hostip: 192.168.1.253
  application: Y                         NIC: eth1
   act/sby: act                           application: X
   vlan_id: 100                            act/sby: sby
   subnet: 192.168.3.0/24                  vlan_id: 101
   hostip: 192.168.3.254                   subnet: 192.168.2.0/24
 NIC: eth1                                 hostip: 192.168.2.253
  application: X                         NIC: eth2
   act/sby: sby                           application: Y
   vlan_id: 101                            act/sby: act
   subnet: 192.168.2.0/24                  vlan_id: 102
   hostip: 192.168.2.254                   subnet: 192.168.3.0/24
  application: Y                           hostip: 192.168.3.253
   act/sby: sby                          Server : C
   vlan_id: 101                           NIC: eth0
   subnet: 192.168.4.0/24                  application: X
   hostip: 192.168.4.254                   act/sby: act
 NIC: eth2                                 vlan_id: 100
  application: Z                           subnet: 192.168.1.0/24
   act/sby: act                            hostip: 192.168.1.252
   vlan_id: 102                          NIC: eth1
   subnet: 192.168.5.0/24                  application: X
   hostip: 192.168.5.254                   act/sby: sby
                                          vlan_id: 101
                                          subnet: 192.168.2.0/24
                                          hostip: 192.168.2.252
```

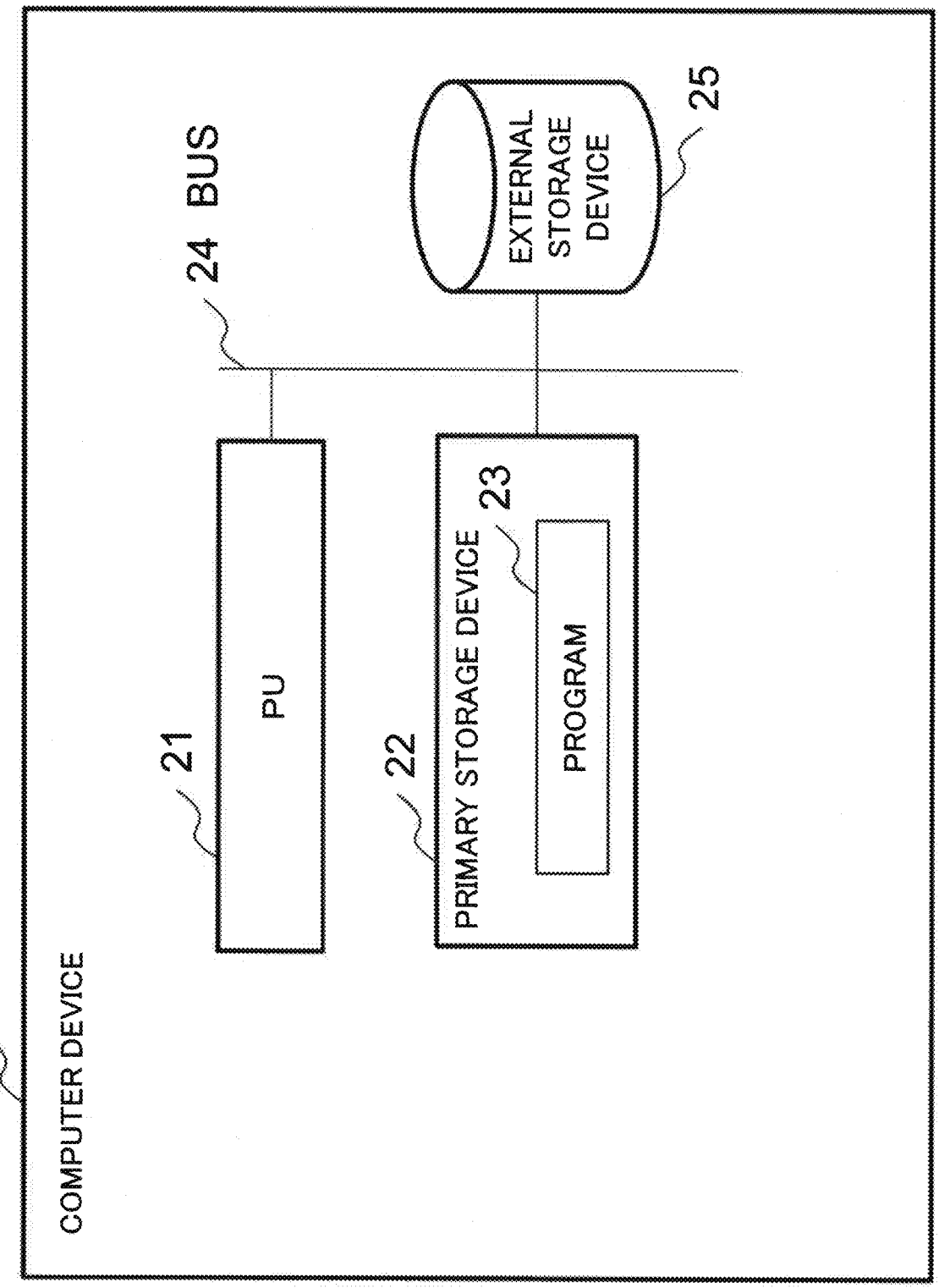

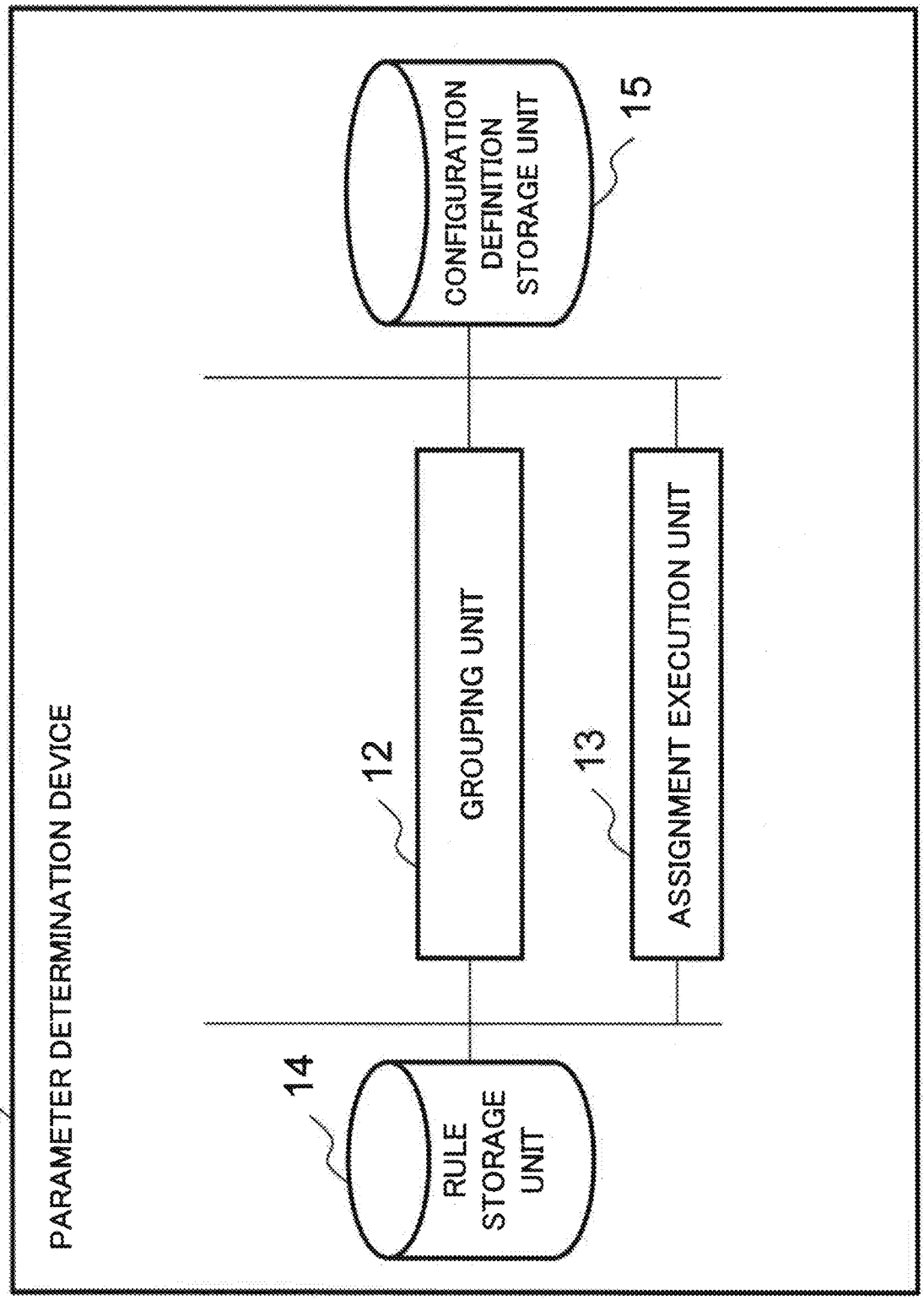

PARAMETER DETERMINATION DEVICE, PARAMETER DETERMINATION METHOD, AND MEDIUM

This application is a National Stage Entry of PCT/JP2016/002440 filed on May 19, 2016, which claims priority from Japanese Patent Application 2015-105111 filed on May 25, 2015, the contents of all of which are incorporated herein by reference, in their entirety.

TECHNICAL FIELD

The present invention relates to a parameter determination device, a parameter determination method, and a medium and, in particular, to a device, a method, and a medium for determining parameters of a system configuration definition.

BACKGROUND ART

In recent years, there is a trend toward writing and managing information about a configuration of an information system in a form of a structured document. In particular, it is a widespread practice to describe information about components of an information system such as a virtual server or a network in Extensible Markup Language (XML) or JavaScript® Object Notation (JSON), and to manage the information as configuration definition files for the information system. A purpose of such management is to deploy the virtual server onto a cloud infrastructure.

Since these configuration definition files are structured documents, the configuration definition files have advantages in terms of handling structured documents in general, for example, ease of partial extraction/copying/reuse. Accordingly, a complicated information system that meets individual requirements can be easily constructed by combining system designs (design patterns) that are broken down into patterns, relatively.

However, in just structuring, when changes in some categories cause changes to other categories, all of the changes need to be checked and appropriate changing work (determination of parameters) needs to be manually performed. The changing work needs to be carefully performed by an operator who completely knows dependence among components of the system. Further, when a system in which a plurality of components having multiple setting categories have dependence is targeted, the changing work may be very burdensome. Moreover, when a size of a system is greater than a certain size or when the changes need to be repeated by a plurality of times, an amount of the changing work becomes huge and the work itself becomes difficult to perform. The changing work therefore becomes a factor that hinders reuse of existing configuration definitions by combining such definitions.

An issue is how consistency among set values after system changes can be maintained without being affected by the number of changes and a scale of the changes, in order to reduce the work. To solve the issue, a method for defining dependence among the setting categories (parameters) and specifics thereof, and recalculating the parameters as required is needed.

PTL 1 discloses a method for defining dependence among the setting categories. Specifically, PTL 1 discloses a technique of automatically changing dependent categories in a particular changed pattern and presenting points to be changed after definition information concerning software development is changed, by assigning dependence among parameters in the definition information to the parameters as a rule.

As a representation that defines specifics of dependence, a reference representation that uses a reference model is widely used in a common programming language and spreadsheet software as well as in PTL 1. For example, when dependence is that a parameter A has the same value as a parameter B, an abstract representation, ", B", which means "is equal to a set value of the parameter B", is used as a set value of the parameter A, instead of describing the current same set value as the parameter B. This automates re-setting of the parameter A when the parameter B is changed.

CITATION LIST

Patent Literature

[PTL 1] Japanese Laid-open Patent Publication No. H5 (1993)-081001

SUMMARY OF INVENTION

Technical Problem

There exist many requirements for grouping certain components in a configuration information setting file for an information system and assigning parameters that are unique within the group. For example, an Internet Protocol (IP) address assigned to a server needs to be unique within a group of servers that perform communication. In this case, the servers form a group and the IP address is a parameter to be uniquely set within the group.

Further, there also exist many requirements for grouping certain components at the same time and assigning an identical parameter to the components within the group. One example is VLAN-ID assignment in network isolation using a VLAN for each group of servers that perform communication, for example.

An issue of determining parameters for such groups cannot be solved simply by referring to or modifying set values of certain setting categories. Specifically, the issue of determination cannot be solved simply by using only representation that simply uses a reference model as in PTL 1, because a criterion for grouping, specification of a range of elements to be grouped, and the like are needed.

Further, some relational database management systems (RDBMSs) provide, as part of Structured Query Language (SQL), a special function representation in order to assign a sequential number to each element by specifying a grouping condition. The function is typically provided under a name such as Row number. For example, an SQL "select row number( ) over (partition by col1 order by id) as col2 from tb1;" describes that rows are grouped by a column col1 of a table tb1 and sequential numbers (1, 2, 3, . . . ) are output to a column col2 in the order in which the rows are sorted by a column id. By using this functionality, setting parameters in tabular form can be grouped based on a parameter value of a certain column, and an identical parameter value can be set for each group.

However, the method cannot solve the issue of grouping concerning setting of system configuration information and determining parameters of elements thereof. This is because assigned parameters are limited to sequential numbers and programming of SQL is required for each setting parameter. Since the method organizes system configuration data as RDB data in the first place, an advantage of handing system configuration data as a structured document is lost.

An object of the present invention is to provide a parameter determination device, a parameter determination method, and a program for solving the issue described above.

Solution to Problem

A parameter determination device according to one aspect of the present invention includes: a processing unit (PU); and a storage, wherein the storage stores: a program; a system configuration definition including a plurality of elements each of which is a parameter set to a setting category that defines a configuration of a system; and a rule including identifiers of first and second ones of the setting categories; and the PU reads the program and performs functions, the function including: a grouping unit that groups the elements, based on the parameter for the second setting category of the elements; and an assignment execution unit that sets and outputs a parameter that is identical within a group or that is unique within the group, for the first setting category of each of the elements in the group.

A parameter determination method according to one aspect of the present invention includes: storing a system configuration definition including a plurality of elements each of which is a parameter set to a setting category that defines a configuration of a system; storing a rule including identifiers of first and second setting categories; grouping the elements, based on the parameter of the second setting category of the elements; and setting and outputting a parameter that is identical within a group or that is unique within the group, for the first setting category of each of the elements in a group.

A computer readable non-transitory storage medium according to one aspect of the present invention embodies a program. The program causes a computer to perform a method. The method includes: storing a system configuration definition including a plurality of elements each of which is a parameter set to a setting category that defines a configuration of a system; storing a rule including identifiers of first and second setting categories; grouping the elements, based on the parameter of the second setting category of the elements; and setting and outputting a parameter that is identical within a group or that is unique within the group, for the first setting category of each of the elements in the group.

Advantageous Effects of Invention

A parameter determination device according to the present invention is capable of grouping elements, such as devices and application programs, included in a system configuration and flexibly determining parameters of the elements, based on a group configuration, in preparing a system configuration definition.

BRIEF DESCRIPTION OF DRAWINGS

FIG. 4 is a diagram illustrating an example of system configuration definition describing the example configuration in FIG. 3;

FIG. 5 is a configuration diagram of rules;

FIG. 11 illustrates the system configuration definition in FIG. 4 after setting elements set by the parameter determination device are added;

FIG. 12 is a configuration diagram of a computer device 20; and

FIG. 13 is a configuration diagram of a parameter determination device 10 according to a third example embodiment.

DESCRIPTION OF EMBODIMENTS

<First Example Embodiment>

Figure 1:
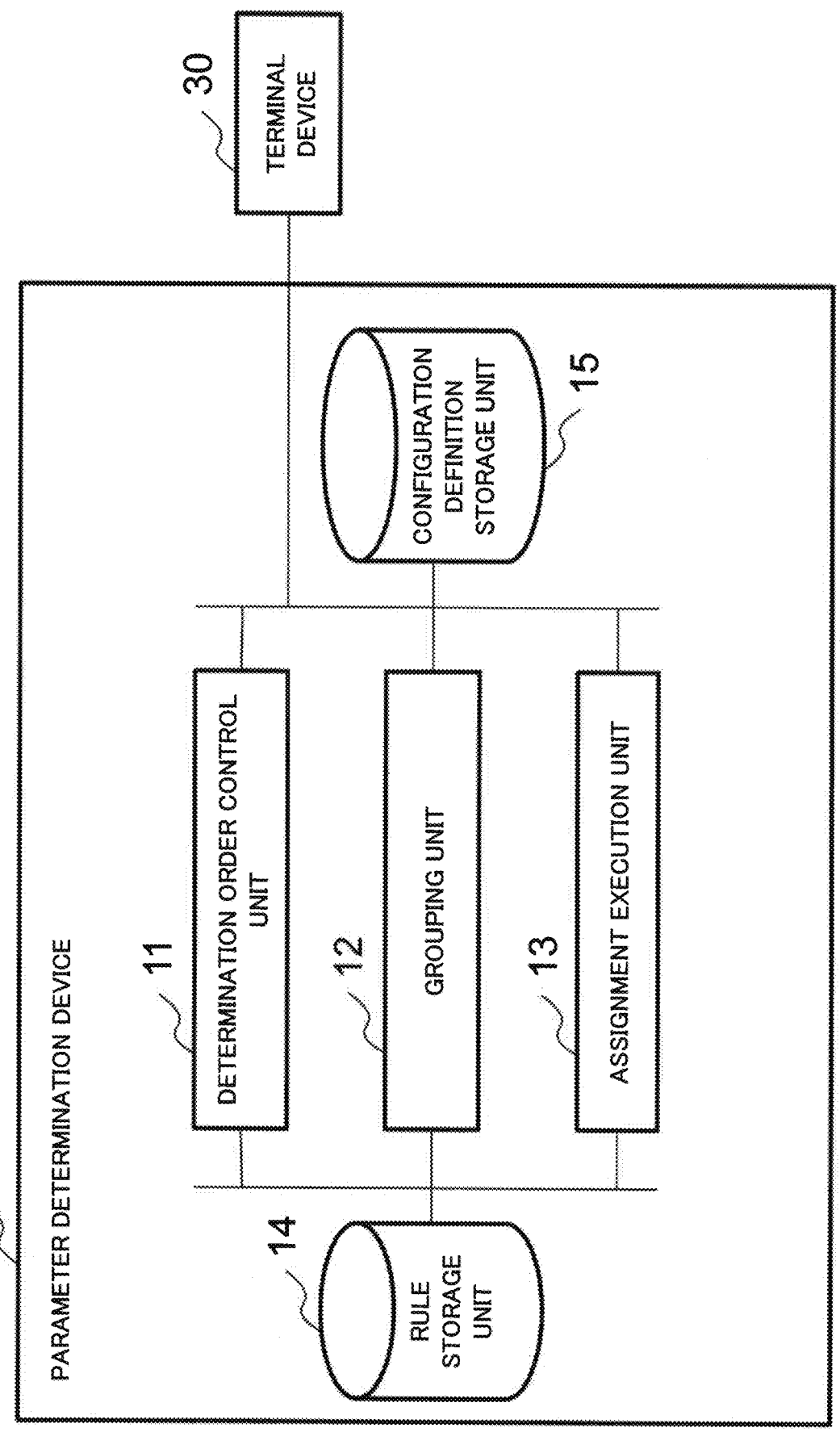
FIG. 1 is a configuration diagram of a parameter determination device 10 according to a first example embodiment.

FIG. 1 is a configuration diagram of a parameter determination device 10 according to a first example embodiment of the present invention. The parameter determination device 10 according to the present example embodiment includes a determination order control unit 11, a grouping unit 12, an assignment execution unit 13, a rule storage unit 14, and a configuration definition storage unit 15. Further, a terminal device 30 is connected to the parameter determination device 10.

Figure 2:
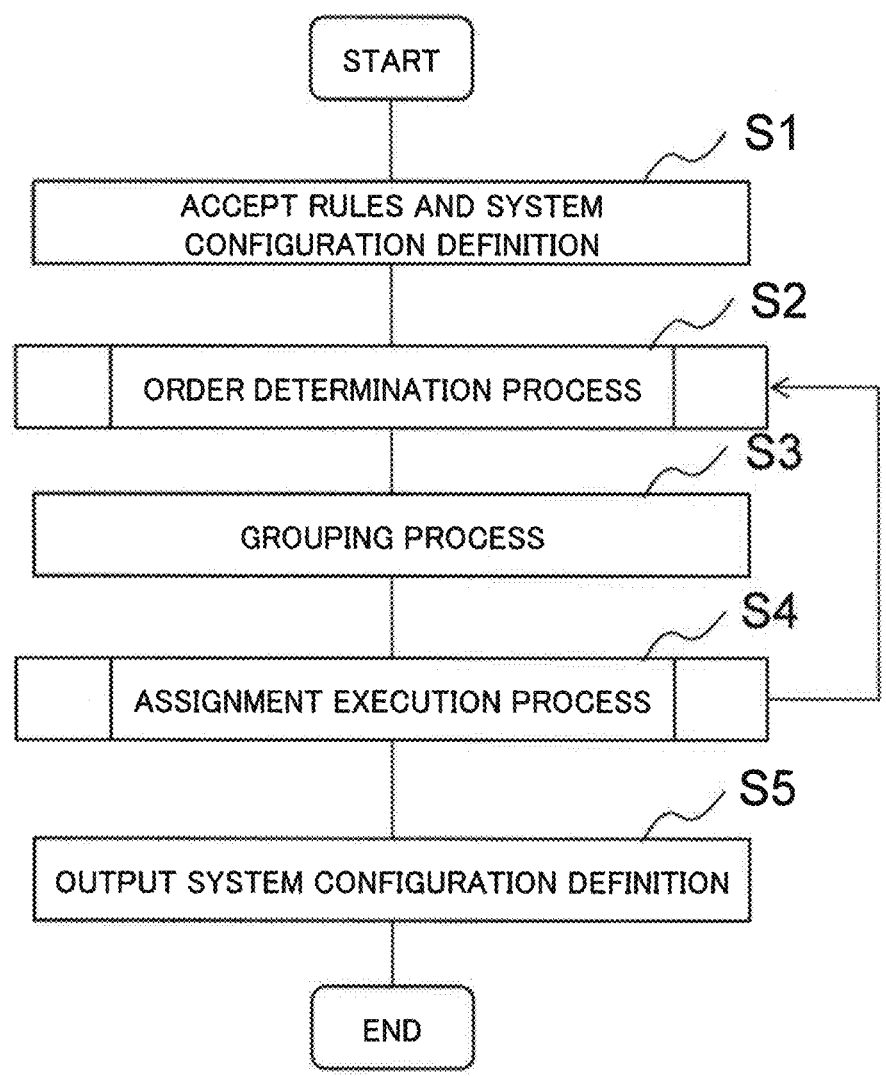
FIG. 2 is an operation flowchart of a parameter determination device 10 according to the example embodiment.

FIG. 2 is a flowchart of an operation of the parameter determination device 10 according to the example embodiment. The parameter determination device 10 first accepts and stores a system configuration definition for which parameters (set values) are to be determined and rules for the determination (S1). The determination order control unit 11 herein receives the system configuration definition and the rules from the terminal device 30 and stores the system configuration definition in the configuration definition storage unit 15 and the rules in the rule storage unit 14, for example.

The determination order control unit 11 then determines order in which the rules are to be applied, i.e. order in which parameters are to be determined, and activates the grouping unit 12 and the assignment execution unit 13 and executes the rules in the determined order (S2, S3, and S4 are repeated).

Specifically, the determination order control unit 11 selects a rule to be executed by using a method, which will be described later (S2). Then, the grouping unit 12 extracts elements, which will be described later, from the system configuration definition and groups the elements based on a parameter specified by the rule (S3). Then, the assignment execution unit 13 determines a parameter for the elements in each group (S4). The determined parameters are added to the system configuration definition in the configuration definition storage unit 15. The added parameters may be used in grouping of elements in the execution of a next rule.

After all of the rules are executed, the determination order control unit 11 retrieves the completed system configuration definition from the configuration definition storage unit 15 and sends the system configuration definition to the terminal device 30 and a system where VM is deployed (S5).

Note that the system configuration definition and the rules for determination may be stored in the configuration definition storage unit 15 and the rule storage unit 14, respectively, in advance. In this case, step S1 is not required. Further, the systems where VM is deployed may share the configuration definition storage unit 15 and the determination order control unit 11 may end the operation when the system definition is completed in the configuration definition storage unit 15. In this case, step S5 is not required.

The determination order control unit 11, the grouping unit 12, and the assignment execution unit 13 herein are constituted of logic circuits. The rule storage unit 14 and the configuration definition storage unit 15 are storage devices such as disk devices or semiconductor storage devices.

Note that the parameter determination device 10 may be implemented by a computer device 20. FIG. 12 is a configuration diagram of the computer device 20. The computer device 20 includes a processing unit (PU) 21, a primary storage device 22, and an auxiliary storage device 25, which are interconnected through a bus 24. The PU 21 writes and reads data on the primary storage device 22 and the auxiliary storage device 25 through the bus 24. The PU 21 also executes a program 23 stored in the primary storage device 22. Note that the program 23 may be initially stored in the auxiliary storage device 25 and the PU 21 may load the program 23 from the auxiliary storage device 25 to the primary storage device 22 during initialization of the computer device 20.

The primary storage device 22 herein is a semiconductor memory device. The auxiliary storage device 25 is a storage device such as a disk device or a semiconductor storage device.

The PU 21 functions as the determination order control unit 11, the grouping unit 12, and the assignment execution unit 13 by executing the program 23. In other words, the PU 21 executes processes performed by the determination order control unit 11, the grouping unit 12, and the assignment execution unit 13 by executing the program 23. The auxiliary storage device 25 functions as the rule storage unit 14 and the configuration definition storage unit 15.

The system configuration definition is a definition file that represents a configuration of an information system that is written in a structured document. The system configuration definition includes a plurality of setting elements. The setting element is a set of an identifier of a setting category (hereinafter abbreviated as category ID) and a set value (a parameter), for example.

In the system configuration definition, the setting elements are in the form of a nest structure or a list structure and are written in XML or JSON, for example. Herein, the nest is a structure in which a setting element is contained as a set value, and the list is a structure in which set values are a plurality of values or setting elements.

Figure 3:
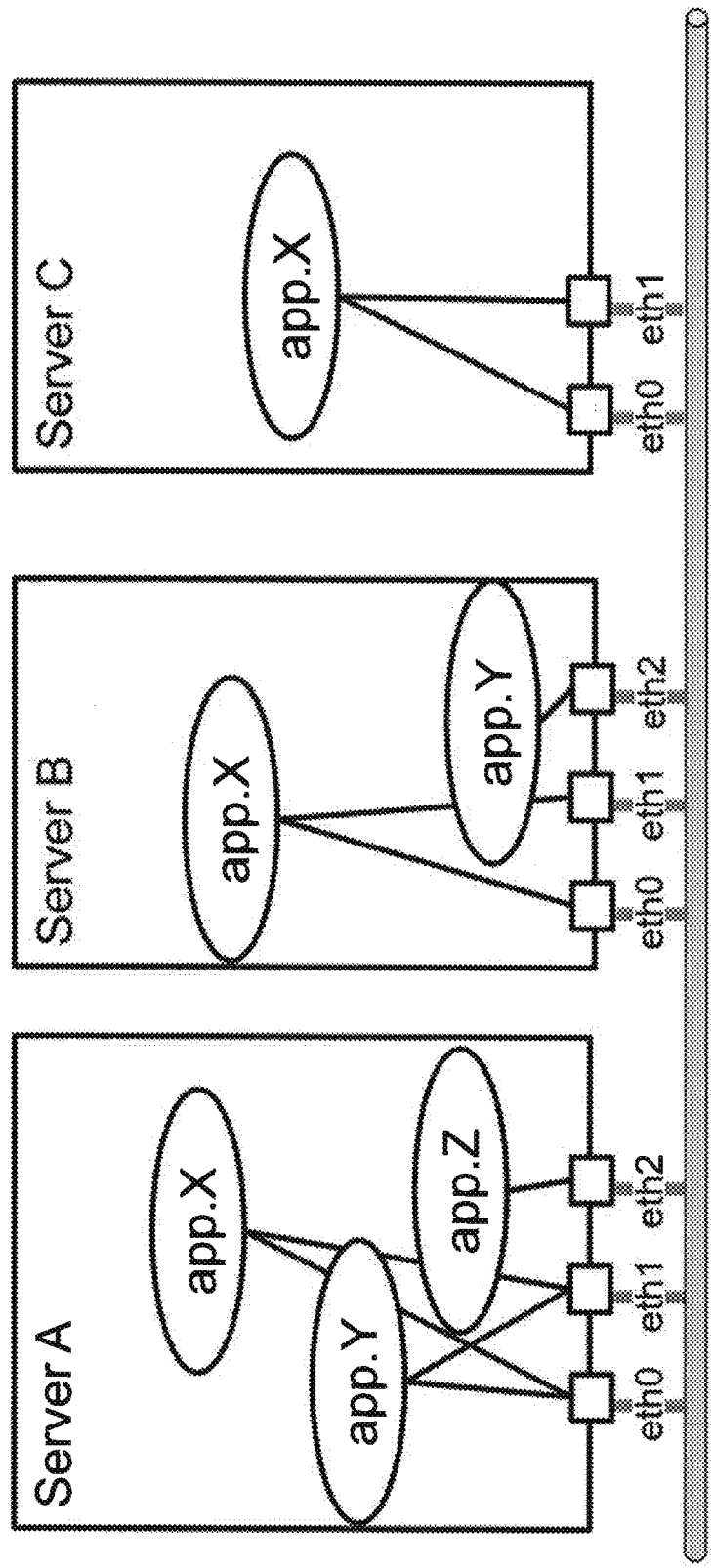
FIG. 3 is a diagram illustrating an example configuration of an information system.

FIG. 3 is a diagram illustrating an example configuration of an information system. FIG. 4 is a diagram illustrating an example of the system configuration definition that describes the example configuration in FIG. 3.

The information system in FIG. 3 includes three server computers (abbreviated as Server in the figure) A, B, and C interconnected via Ethernet®. Three application programs (abbreviated as app. in the figure) X, Y, and Z are running on the server computer A. Two application programs X and Y are running on the server computer B. An application program X is running on the server computer C.

On the server computer A, the application programs X and Y perform communication by using eth0 and eth1 of a network interface card (NIC). The application program Z performs communication by using eth2 of NIC. On the server computer B, the application program X performs communication by using eth0 and eth1 of NIC. The application program Y performs communication by using eth2 of NIC. On the server computer C, the application program X performs communication by using eth0 and eth1 of NIC.

The example of the system configuration definition in FIG. 4 describes the configuration of the information system described above in a structured document. In the example of the system configuration definition, "Server: A", "NIC: eth 0" and "application: X", for example, are the setting elements. The setting element "Server: A" on the first line is set a parameter A to a setting category server, and defines the server computer A. The setting element "NIC: eth 0" on the second line is set a parameter eth0 to a setting category NIC, and defines the eth0 of NIC. The setting element "application: X" on the third line is set a parameter X to a setting category application, and defines the application program X.

Further, in the example of the system configuration definition in FIG. 4, nesting of the setting elements is represented by an indentation, and listing is represented by beginning a new line without an indentation. For example, in the example of the system configuration definition, the eth0, eth1, and eth2 of NICs are defined by nesting for the server computer A. This indicates that the server computer A includes the eth0, eth1, and eth2 of NICs. Further, the application programs X and Y are defined for the eth0 of NIC, the application programs X and Y are defined for the eth1 of NIC, and the application program Z is defined for the eth2 of NIC, each by nesting. This defines that, on the server computer A, the eth0 and the eth1 of NICs are used by the application programs X and Y, and the eth2 of NIC is used by the application program Z. Similarly, states of the server computers B and C in FIG. 3 are described.

In a system configuration definition, a combination of parameters set by setting elements is referred to as an element. An element in the example system configuration definition in FIG. 4 is a combination of a parameter of a server computer setting category, a parameter of an NIC setting category, and a parameter of an application program setting category. Specifically, the example system configuration definition in FIG. 4 includes 10 elements: (A, eth0, X), (A, eth0, Y), (B, eth0, X), (C, eth0, X), (A, eth1, X), (A, eth1, Y), (B, eth1, X), (C, eth1, X), (A, eth2, Z), and (B, eth2, Y).

In other words, it can be said that the system configuration definition defines a plurality of elements. Note that the system configuration definition may be written in a description format different from the example illustrated in FIG. 4 as long as a plurality of elements can be defined. For example, the system configuration definition may be a list of a plurality of elements. Note that an element may include a category ID.

FIG. 5 is a configuration diagram of rules handled by the parameter determination device 10 according to the present example embodiment. The rule contains a category ID to which a parameter is to be assigned (indicated as Assignment target category ID in the figure) and a category ID by which elements are grouped (indicated as Group-by category ID in the figure). Further, the rule contains a candidate parameter set, an assignment method, and a specification of a scope.

The candidate parameter set herein is a set of parameters to be assigned to a setting category identified by the assignment target category ID and is, for example, specified as a range of values, an enumeration of elements, or a name of the set. In the example in FIG. 5, '1→254' means a set of natural numbers equal to or more than 1 and equal to or less than 254, 'Class C' means a set of IP addresses of class C, '"act", "sby"' means a set of the two values as elements, and '100→200' means a set of natural numbers equal to or more than 100 and equal to or less than 200.

The assignment method defines how parameters are to be assigned from the candidate parameter set. In the example in FIG. 5, "cyclic" means that elements in a set are sequentially assigned in a cyclic manner, "descending order" means that the greatest candidate value among unassigned candidate parameters is assigned, and "ascending order" means that the smallest candidate value among unassigned candidate parameters is assigned.

The scope specifies, for each group of elements, whether an identical parameter is set for the elements (global) or a parameter that is unique within the group is set for each element in the group (local).

Figure 7:
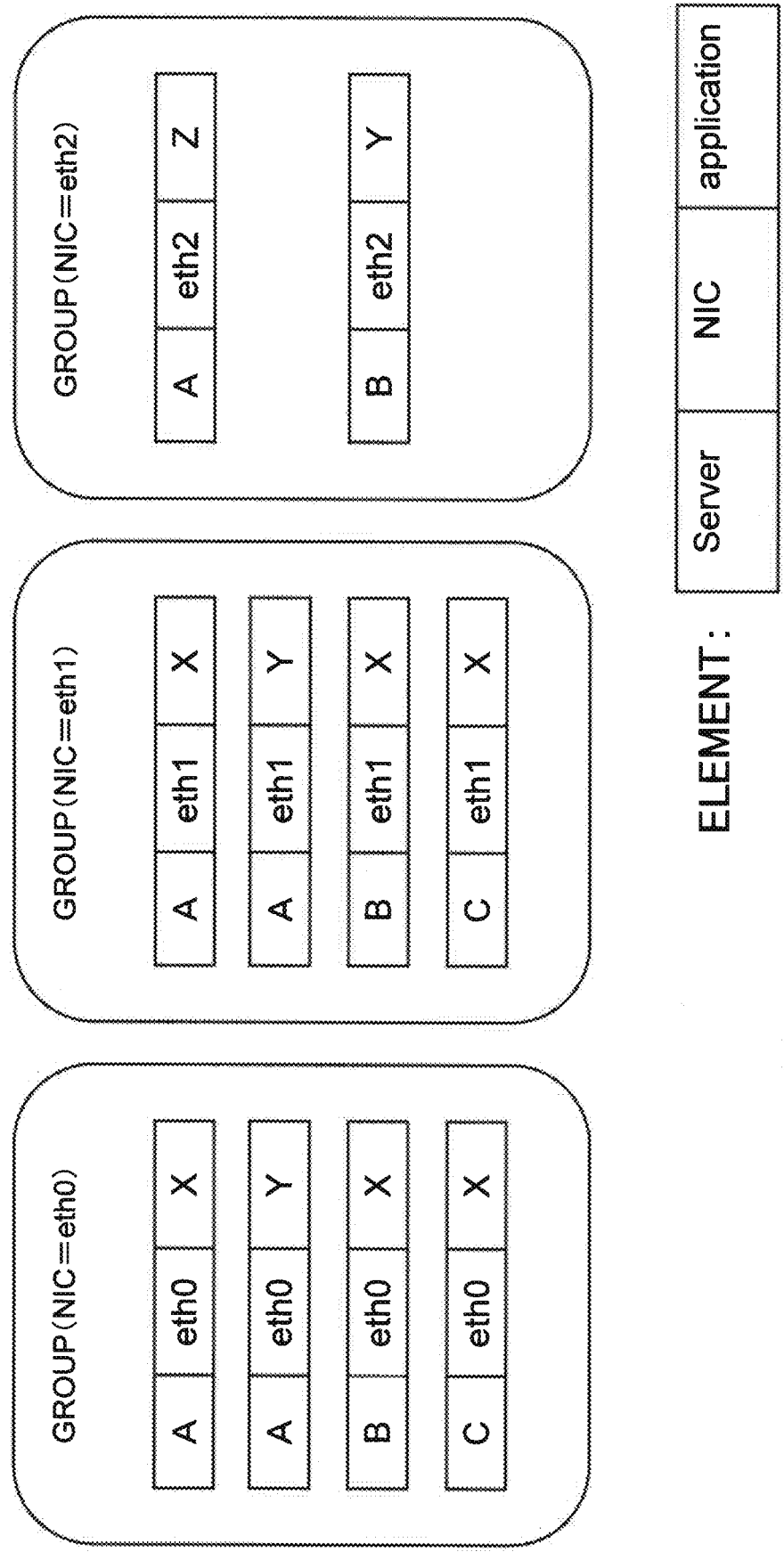
FIG. 7 is a diagram illustrating a result of grouping based on the last rule in FIG. 5 (a rule in which an assignment target category is VLAN_ID) for the example of the system configuration definition in FIG. 4.
Figure 9:
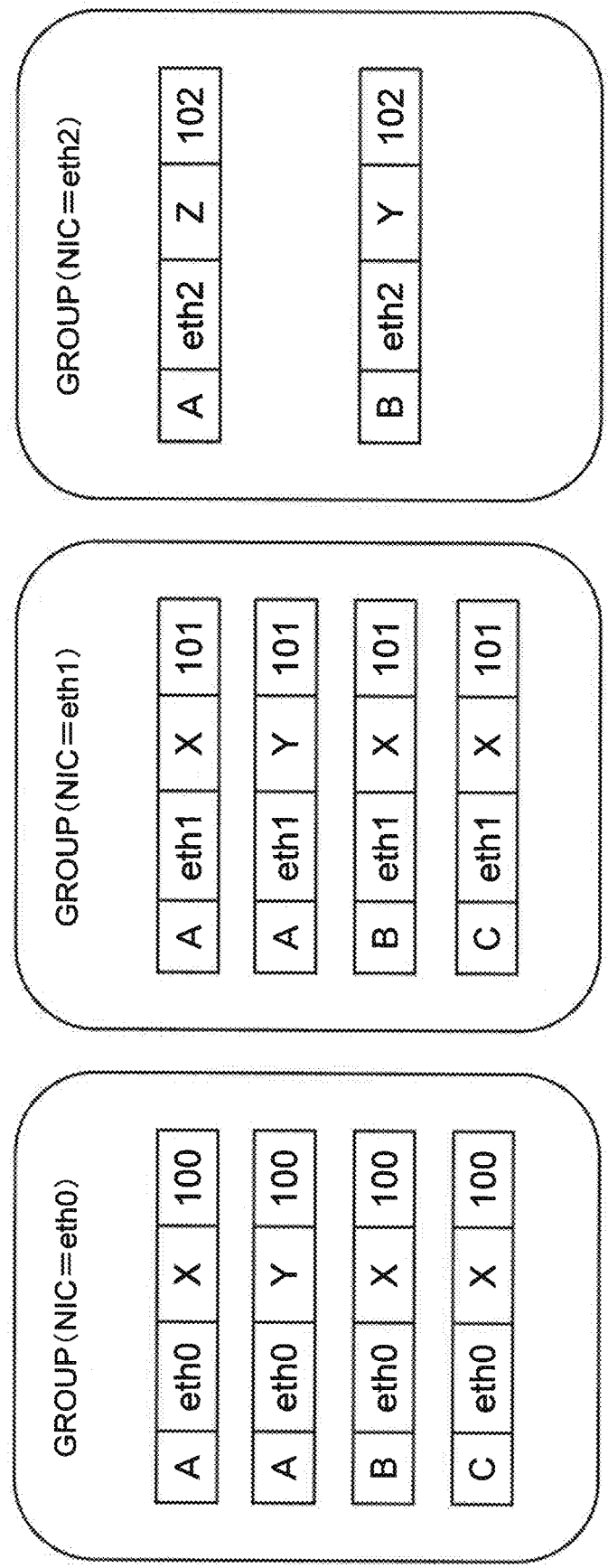
FIG. 9 illustrates a result of parameter determination for setting category VLAN_ID, for the system configuration definition in FIG. 4, based on the last rule in FIG. 5.

The last rule in FIG. 5, for example, specifies that a setting category for which parameter setting is to be performed is "VLAN_ID" and elements are to be grouped by an NIC setting category. The group of elements grouped as a result of execution of this rule is illustrated in FIG. 7. This rule further defines that, for each group, the smallest unassigned candidate value among candidate parameters starting from 100 is to be assigned and the same value is to be set for each element in the group. Note that the settings are illustrated in FIG. 9.

Figure 10:
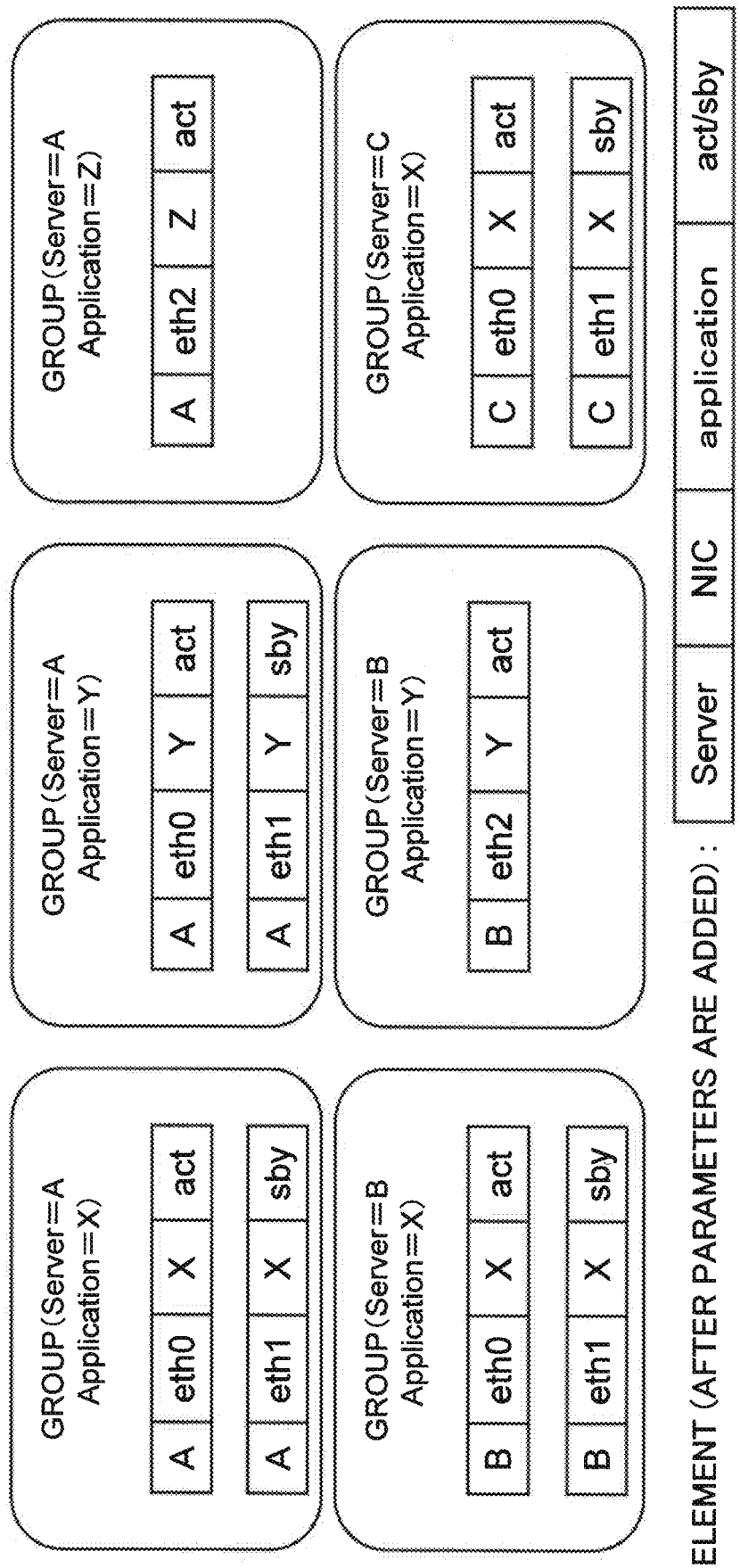
FIG. 10 illustrates a result of parameter determination for a setting category "act/sby", for the system configuration definition in FIG. 4, based on the first rule in FIG. 5.

The first rule in FIG. 5, for example, specifies that a setting category for which parameter setting is to be performed is "act/sby" (active/standby) and elements are to be grouped by a combination of parameters of a server computer setting category and an application program setting category. This rule further specifies that act (active) and sby (standby) are to be alternately set for the elements in the group. Note that the groups and settings are illustrated in FIG. 10.

Further, the third rule in FIG. 5 specifies that a setting category for which parameter setting is to be performed is "host IP address" and elements are to be grouped by a parameter of a subnet-IP-address-setting-category determined according to the second rule. This rule further defines that natural numbers, 254, 253, 252, . . . are sequentially assigned and set from a set of natural numbers equal to or more than 1 and equal to or less than 254 to the elements in the group each time assignment is executed.

Note that, as can be seen from the description above, the third rule cannot be executed until after execution of the second rule. The determination order control unit 11 identifies this condition and adjusts the order in which rules are executed.

<Process Performed at Step S2 in FIG. 2>

Figure 6:
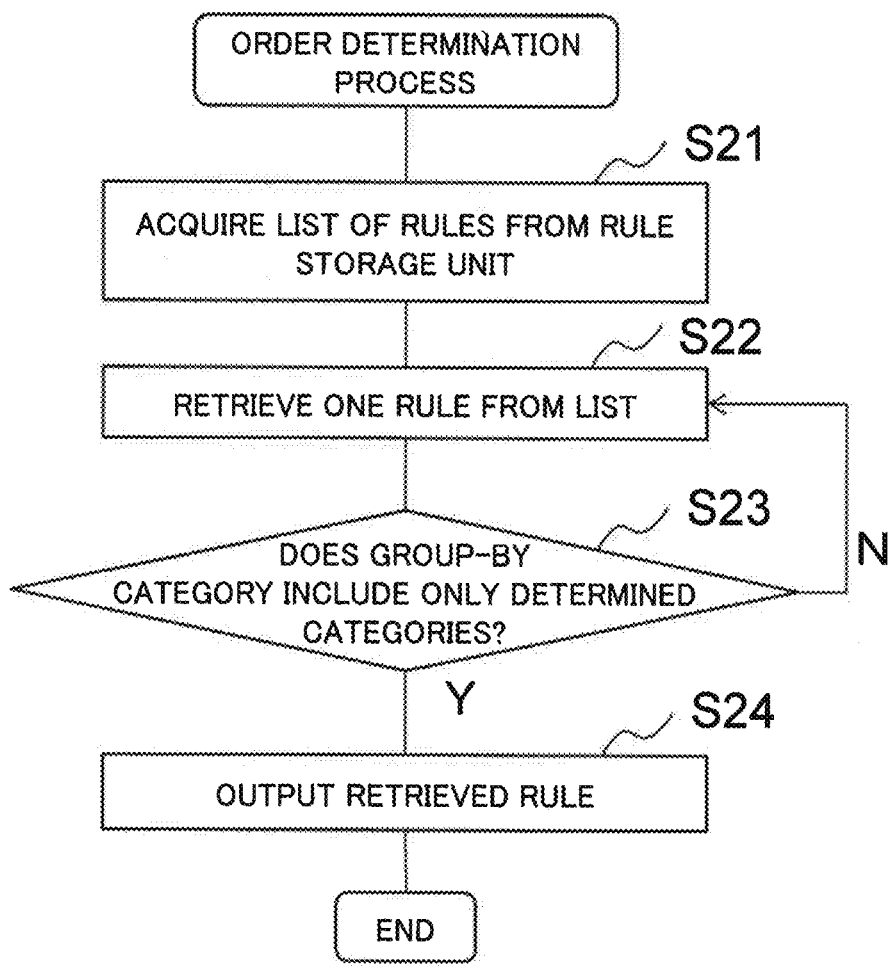
FIG. 6 is a flowchart of a determination process for order of rule processing performed by a determination order control unit 11.

FIG. 6 is a flowchart of a determination process for order of rule processing performed by the determination order control unit 11. This is performed at step S2 in FIG. 2.

The determination order control unit 11 selects a rule to be executed according to the figure. As described above, some rules cannot be executed until after execution of another rule. Specifically, when an undetermined setting category is included among setting categories indicated by a group-by category ID specified by a rule, parameter determination that uses the rule cannot be performed at the point. The determination order control unit 11 therefore postpones, by this order determination process, the execution of the rule until after a parameter of the setting category specified by the group-by category ID has been determined.

First, the determination order control unit 11 acquires a list of rules from the rule storage unit 14 (S21) and retrieves one of the rules from the list (S22). The determination order control unit 11 then checks whether the setting categories indicated by the group-by category ID in the rule include only categories for which parameters have been determined (S23).

At this point, the determination order control unit 11 treats setting categories for which parameters have been determined beforehand on a system configuration definition provided from a user as setting categories for which parameters have been originally determined. In the example of the system configuration definition in FIG. 4, the server computer setting category "Server", the NIC setting category "NIC", and the application program setting category "application" are originally determined setting categories from the beginning of the process.

The determination order control unit 11 receives setting categories for which parameters have been determined by the assignment execution unit 13 from the assignment execution unit 13, and adds the setting categories to elements one after another. In this way, a rule the execution of which has been postponed can eventually be executed.

The determination order control unit 11 adds the parameter added to the element to the system configuration definition. Specifically, the determination order control unit 11 adds the setting element including the determined parameter by nesting the setting element one level deeper than a setting element that represents the first element of the system configuration definition, for example. FIG. 11 illustrates the system configuration definition in FIG. 4 after setting categories added by the parameter determination device 10 are added. For example, a setting element "act/sby: act" added by the first rule in FIG. 5 is nested one level deeper than a setting element "application: X". However, a new setting element may be added in any other writing format as long as an element to which the new setting element has been added can be identified.

When setting categories indicated by a group-by category ID in the retrieved rule include only categories for which parameters have been determined (Y at S23), the determination order control unit 11 outputs the rule. The determination order control unit 11 sends the rule to the grouping unit 12 and the assignment execution unit 13, for example (S24).

When the setting categories indicated by a grope-by category ID of the retrieved rule do not include only categories for which parameters have been determined (N at S23), the determination order control unit 11 returns to S22, retrieves another rule and executes S23 again. In the example rules in FIG. 5, the second rule is postponed until the first rule is executed and a parameter of the act/sby setting category is determined; the third rule is postponed until the second rule is executed and a subnet IP address setting category is determined.

<Process Performed at Step S3 in FIG. 2>

In the grouping process illustrated in step S3 in FIG. 2, the grouping unit 12 groups elements extracted from the system configuration definition, based on the rule received from the determination order control unit 11. The elements to be grouped are combinations of setting categories to the deepest level of nesting in the system configuration definition, for example. In the example of the system configuration definition in FIG. 4, the element is a combination of the parameter of the server computer setting category, the parameter of the NIC setting category, and the parameter of the application program setting category.

FIG. 7 is a diagram illustrating a result of grouping based on the last rule in FIG. 5 (the rule in which the assignment target category is VLAN_ID) for the example of the system configuration definition in FIG. 4. In this figure, each rectangle in which three frames are adjacent to one another represents a grouping target element. The frames represent parameters of the server computer setting category, the NIC setting category, and the application program setting category, in order from left.

Since the setting category indicated by the group-by category ID in the last rule in FIG. 5 is the NIC setting category, groups are formed according to parameter values of NIC as illustrated in FIG. 7. In FIG. 7, groups of elements having parameters, eth0, eth1, and eth2, of the NIC setting category, in order from left, are illustrated.

<Process Performed at Step S4 in FIG. 2>

Figure 8:
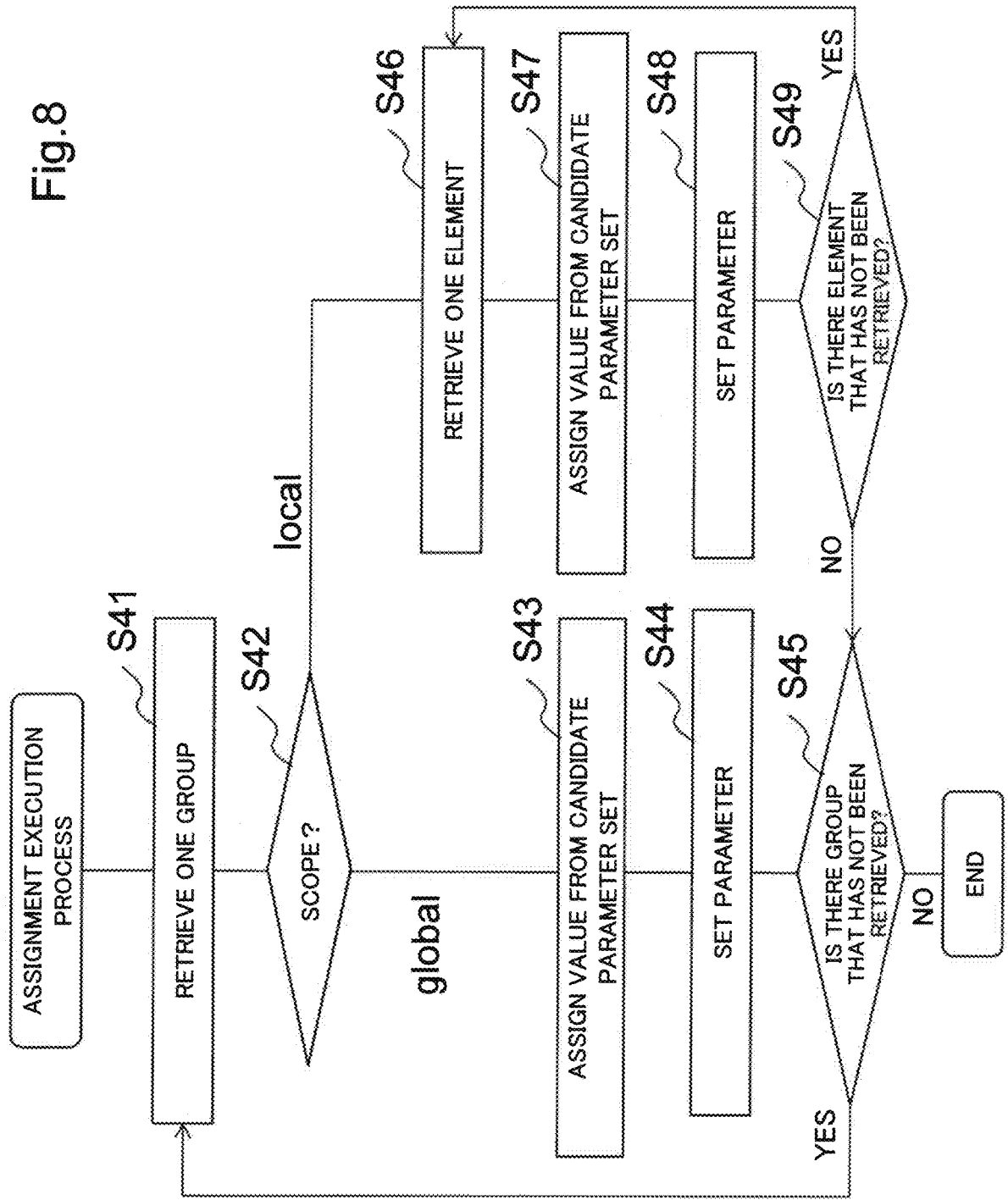
FIG. 8 is a flowchart of an assignment execution process performed by an assignment execution unit 13.

The elements grouped at the grouping unit 12 are passed to the assignment execution unit 13 and an assignment execution process is performed at step S4 in FIG. 2. FIG. 8 is a flowchart of the assignment execution process performed by the assignment execution unit 13.

In the assignment execution process, first the assignment execution unit 13 retrieves one group of elements (S41), and identifies a scope in the parameter determination rule (S42). When the scope is global (global at S42), the assignment execution unit 13 refers to an assignment method in the parameter determination rule and assigns a parameter from the candidate parameter set according to the relevant assignment method (S43). The assignment execution unit 13 then sets the assigned parameter for all of the elements in the group (S44). When there is a group that has not been retrieved (Yes at S45), the assignment execution unit 13 returns to S41 and assigns a parameter to the elements of another group. The assignment execution unit 13 repeats the process sequence for each group until parameters are assigned to all groups (No at S45).

When the scope is local (local at S42), the assignment execution unit 13 retrieves one element from the group (S46), assigns a parameter from the candidate parameter set according to the assignment method in the rule (S47), and sets the assigned parameter for the retrieved element (S48). The assignment execution unit 13 repeats the process sequence for each element until there is no longer an element that has not been retrieved from the group (No at step S49).

The assignment execution unit 13 stores an assigned candidate value after each assignment, and assigns a value other than the assigned candidate value at next assignment. The elimination of an assigned candidate value is performed when there is no longer an element that has not been retrieved from a group (No at S49) and switching is made from the assignment target group to another.

However, when the assignment method is cyclic, the assignment execution unit 13 stores an assigned candidate value after each assignment and assigns a next candidate value in the cyclic order at next assignment. The elimination of storage of an assigned candidate value is performed when there is no longer an element that has not been retrieved from a group (No at S49) and switching is made from the assignment target group to another.

Note that, when the scope is global, assigned candidate values continue to be saved in one iteration of the assignment execution process.

FIG. 9 illustrates a result of parameter determination for the setting category VLAN_ID for the system configuration definition in FIG. 4, based on the last rule in FIG. 5. As mentioned previously, FIG. 7 illustrates groups of elements assigned by the rule. In the rule, the scope is global, and the candidate parameter set and the assignment method are ascending order from 100. Accordingly, the assignment execution unit 13 assigns parameters 100, 101, and 102 to the groups having parameters, eth0, eth1, and eth2, respectively, of the NIC setting category, and assigns an identical value to the VLAN_ID setting category of each element in a group.

FIG. 10 illustrates a result of parameter determination for the setting category "act/sby" for the system configuration definition in FIG. 4, based on the first rule in FIG. 5.

In the rule, the group-by category is a combination of two setting categories Server and Application. Accordingly, the grouping unit 12 groups elements according to variations of parameters of the two setting categories (A, X), (AY), (AZ), (B, X), (B, Y), and (C, X). Further, in the rule, the scope is local, and the candidate parameter set and assignment method is a cycle of "act" and "sby", i.e. alternating assignment of "act" and "sby". Accordingly, the assignment execution unit 13 alternately assigns "act" and "sby" to the elements of each group. Specifically, for a group having two setting elements, the assignment execution unit 13 assigns one of "act" and "sby" to one of the two elements and assigns another to another of the two elements; for a group having one setting element, the assignment execution unit 13 assigns "act" to the element.

<Process Performed at Step S5 in FIG. 2>

After executing all of the rules stored in the rule storage unit 14, the determination order control unit 11 retrieves the completed system configuration definition from the configuration definition storage unit 15 and outputs the system configuration definition to the outside (S5). FIG. 11 is the system configuration definition output by the determination order control unit 11 when the system configuration definition in FIG. 4 and the rules in FIG. 5 are input.

<Advantageous Effects>

The parameter determination device 10 according to the present example embodiment is capable of flexibly determining parameters for an information system in which set values (parameters) need to be assigned to each group of certain devises, programs or the like, exemplified by network addresses and clustering. Concretely, for preparation of a system configuration definition, the parameter determination device 10 can group elements included in the system configuration and can flexibly determine parameters of elements in the group based on a group configuration.

A first reason is that the grouping unit 12 groups elements extracted from the system configuration definition based on parameters of various setting categories, and parameters are determined by retrieving values from various candidate parameter sets by various ways.

A second reason is that a user defines variations of parameter determination as rules and the parameter determination device 10 determines parameters in accordance with the rules. The user may define rules according to an information system of interest.

A third reason is that the determination order control unit 11 appropriately controls the order in which rules are executed in the process of determination of parameters. The user therefore can describe, in a rule, grouping based on parameters that have not yet been determined in an initial system configuration definition.

<Second Example Embodiment>

A parameter determination device 10 according to a second example embodiment of the present invention determines parameters that need to be newly determined while keeping as many assigned parameters unchanged as possible when making changes to a system configuration definition for which parameters have been determined.

A system configuration definition input into the parameter determination device 10 according to the present example embodiment may be one that has been processed previously on the device. Further, some rules may be already stored in the rule storage unit 14 at initial parameter determination and only a new rule may be input and added to the rule storage unit 14 at this time.

Between step S1 and step S2 in FIG. 2, the determination order control unit 11 checks the system configuration definition against the rules in the rule storage unit 14. When the determination order control unit 11 determines that the parameter has already been assigned to the setting category specified by the assignment target category ID in any of the rules in the system configuration definition, the determination order control unit 11 stores information indicating the assignment.

When the assignment execution unit 13 assigns the parameter (step S44 and step S47 in FIG. 8), the assignment execution unit 13 assigns the already assigned parameter to the assignment target element by referring to the information. In other words, the assignment execution unit 13 continues the assignment of the previously assigned parameter rather than performing assignment of a new parameter from the candidate parameter set. In this case, however, the assignment execution unit 13 performs the following check:

(a) that the parameter has not been already assigned to another element, and (b) that the parameter is included in the candidate parameter set specified in the rule currently being executed.

When the parameter does not satisfy the above conditions, the assignment execution unit 13 assigns the parameter value determined by using a usual assignment method.

The rest of the process is the same as the process performed in the parameter determination device 10 according to the first example embodiment.

<Advantageous Effects>

When a change is made to a system for which parameters have been determined, the parameter determination device 10 according to the present example embodiment is capable of determining changed parameters with a minimum of parameter changes. This is because when there is a parameter that has been already assigned to an assignment target element, the assignment execution unit 13 assigns the parameter.

<Third Example Embodiment>

FIG. 13 is a configuration diagram of a parameter determination device 10 according to a third example embodiment of the present invention. The parameter determination device 10 according to the present example embodiment includes the grouping unit 12, the assignment execution unit 13, the rule storage unit 14, and the configuration definition storage unit 15.

The configuration definition storage unit 15 stores a system configuration definition including a plurality of elements each of which is a parameter set for a setting categories that defines a configuration of a system. The rule storage unit 14 stores rules including identifies of first and second one of the setting categories.

The grouping unit 12 groups the elements, based on the parameter for the second setting category of the elements. The assignment execution unit 13 sets and outputs a parameter that is identical within a group or that is unique within the group, for the first setting category of each of the elements in the group.

The parameter determination device 10 according to the present example embodiment is capable of flexibly determining parameters for an information system in which set values (parameters) need to be assigned to each group of certain devises, programs or the like, exemplified by network addresses and clustering. Concretely, for preparation of a system configuration definition, the parameter determination device 10 can group elements included in the system configuration and can flexibly determine parameters of elements in the group based on a group configuration.

A first reason is that the grouping unit 12 groups elements extracted from the system configuration definition based on parameters of various setting categories, and parameters are determined by retrieving values from various candidate parameter sets by various ways.

A second reason is that a user defines variations of parameter determination as rules and the parameter determination device 10 determines parameters in accordance with the rules. The user may define rules according to an information system of interest.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-105111, filed on May 25, 2015, the disclosure of which is incorporated herein in its entirety by reference.

REFERENCE SINGS LIST

10 Parameter determination device
11 Determination order control unit
12 Grouping unit
13 Assignment execution unit
14 Rule storage unit
15 Configuration definition storage unit
20 Computer device
21 PU
22 Primary storage device
23 Program
24 Bus
25 Auxiliary storage device
30 Terminal device

The invention claimed is:

1. A parameter determination device comprising:
a processor; and
a storage storing:
  a program;
  a system configuration definition including a plurality of elements each of which is a parameter set to a setting category that defines a configuration of a system; and
  a rule including identifiers of first and second ones of the setting categories,
wherein the program is executable by the processor to:
  group the elements, based on the parameter for the second setting category of the elements; and set and output a parameter that is identical within a group or that is unique within the group, for the first setting category of each of the elements in the group, wherein the rule further includes a candidate parameter set and a specification of a scope, and in accordance with the scope of the rule, the program is executable by the processor to further (a) select a unique parameter for each group from the candidate parameter set and set the selected parameter to the first setting category of each of the elements in the group, or (b) select a unique parameter for each of the elements in the group from the candidate parameter set and set the selected parameter to the first setting category of the element, wherein the rule further includes a specification of an assignment method, and the program is executable by the processor to further, in accordance with the assignment method in the rule, sequentially select the respective parameters in the candidate parameter set in a cyclic manner, in ascending order, or in descending order.

2. The parameter determination device according to claim 1, wherein the storage stores a plurality of rules, and the program is executable by the processor to further:

select the rule in which the parameter of the second setting category is set from among a plurality of the rules with reference to the system configuration definition, output the selected rule and process the selected rule, and add, to the system configuration definition, a description for adding the parameter set for the first setting category of the element to the element.

3. The parameter determination device according to claim 1, wherein, when detecting the element in which the parameter is set to the first setting category, the processor determines whether the parameter is already used for another of the elements and, when the parameter is not used, the processor does not select a new one of the parameters from the candidate parameter set and keeps the parameter set for the element.

4. A parameter determination method comprising:

storing a system configuration definition including a plurality of elements each of which is a parameter set to a setting category that defines a configuration of a system;

storing a rule including identifiers of first and second setting categories;

grouping the elements, based on the parameter of the second setting category of the elements; and setting and outputting a parameter that is identical within a group or that is unique within the group, for the first setting category of each of the elements in a group, wherein the rule further includes a candidate parameter set and a specification of a scope, and the parameter determination method further comprises:

in accordance with the scope of the rule, (a) selecting a unique parameter for each group from the candidate parameter set and setting the selected parameter to the first setting category of each of the elements in the group, or (b) selecting a unique parameter for each of the elements in the group from the candidate parameter set and setting the selected parameter to the first setting category of the element, wherein the rule further includes a specification of an assignment method, and the parameter determination method further comprises:

in accordance with the assignment method in the rule, sequentially selecting the respective parameters in the candidate parameter set in a cyclic manner, in ascending order, or in descending order.

5. A non-transitory computer readable storage medium embodying a program causing a computer to perform a method, the method comprising:

storing a system configuration definition including a plurality of elements each of which is a parameter set to a setting category that defines a configuration of a system;

storing a rule including identifiers of first and second setting categories;

grouping the elements, based on the parameter of the second setting category of the elements; and setting and outputting a parameter that is identical within a group or that is unique within the group, for the first setting category of each of the elements in the group, wherein the rule further includes a candidate parameter set and a specification of a scope, and the parameter determination method further comprises:

in accordance with the scope of the rule, (a) selecting a unique parameter for each group from the candidate parameter set and setting the selected parameter to the first setting category of each of the elements in the group, or (b) selecting a unique parameter for each of the elements in the group from the candidate parameter set and setting the selected parameter to the first setting category of the element, wherein the rule further includes a specification of an assignment method, and the parameter determination method further comprises:

in accordance with the assignment method in the rule, sequentially selecting the respective parameters in the candidate parameter set in a cyclic manner, in ascending order, or in descending order.

* * * * *